Oct. 6, 1936.  H. WOLFF  2,056,336
ENVELOPE MAKING MACHINE
Filed Sept. 29, 1933  12 Sheets-Sheet 7
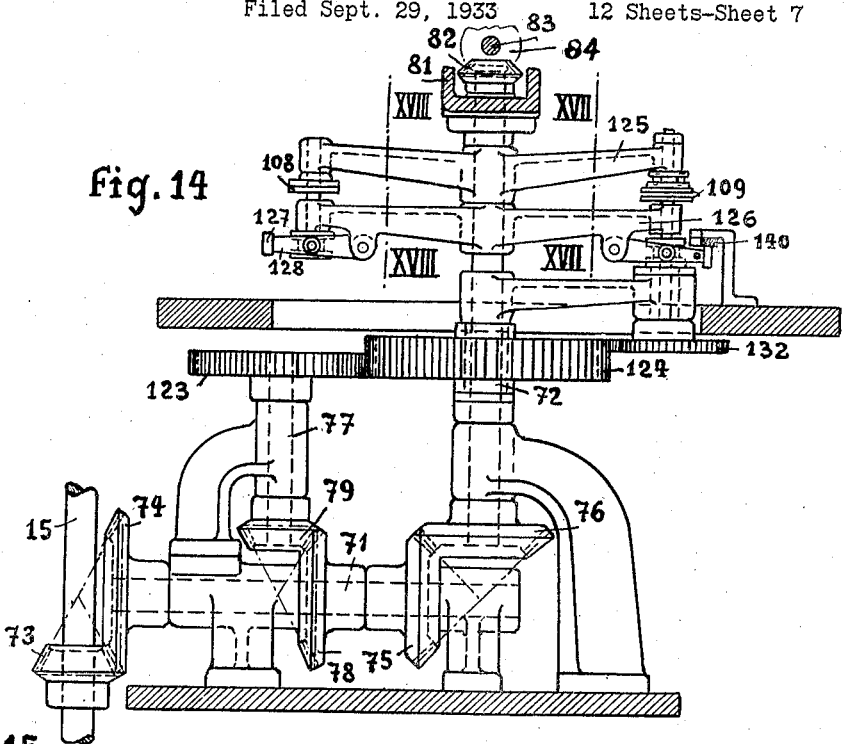
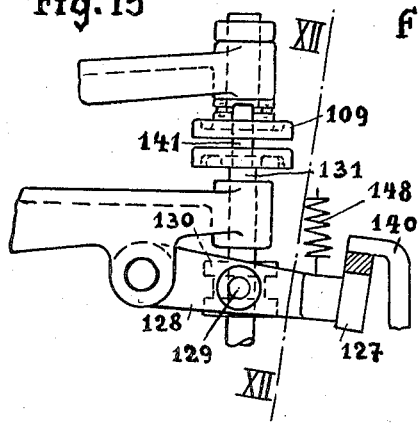
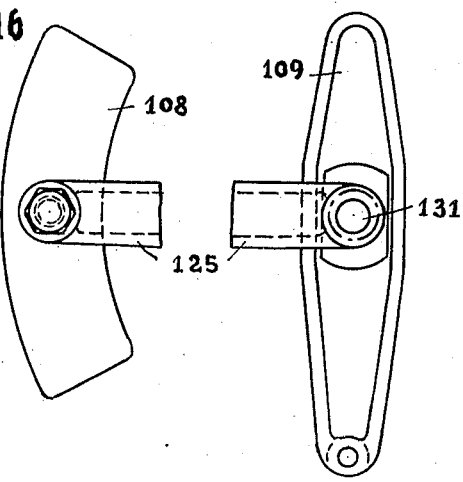
Inventor,
Heinrich Wolff,
by
Attorney.

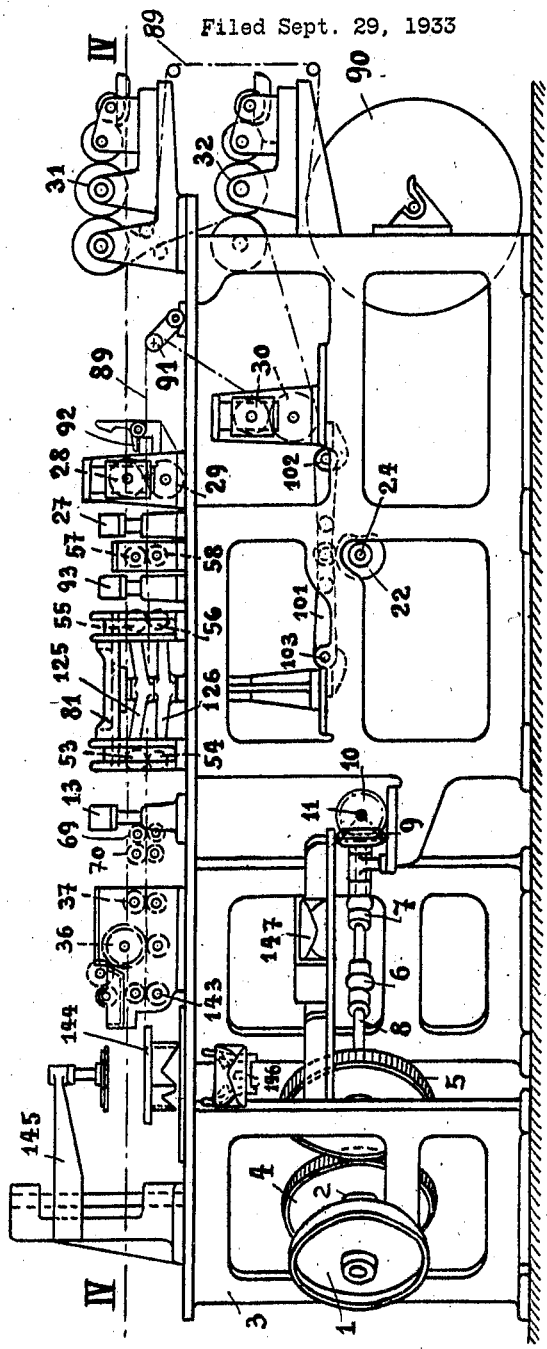

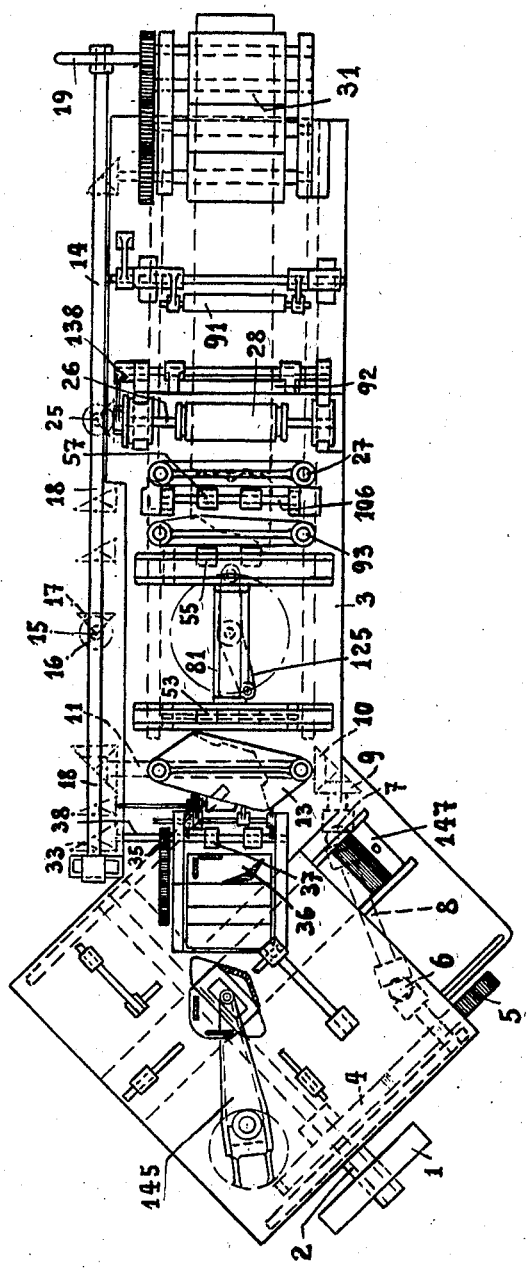

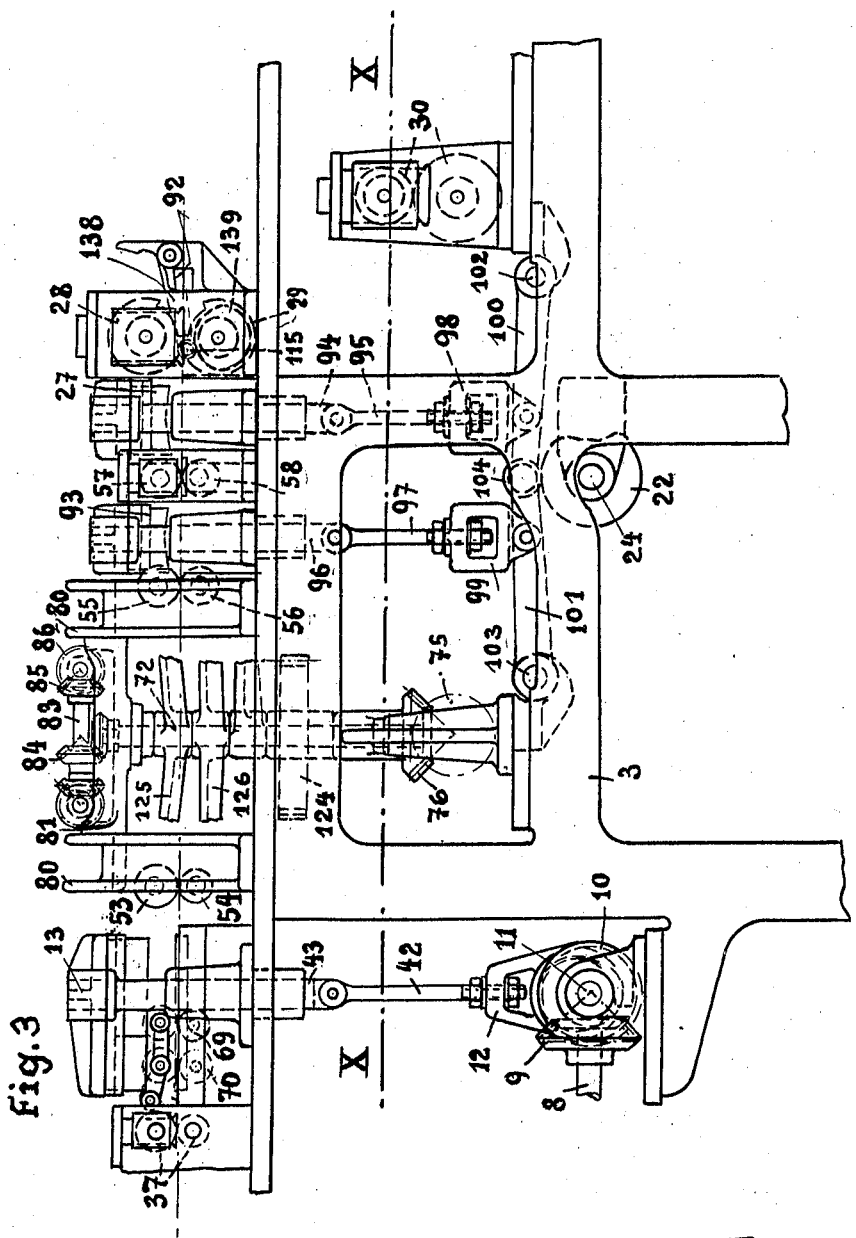

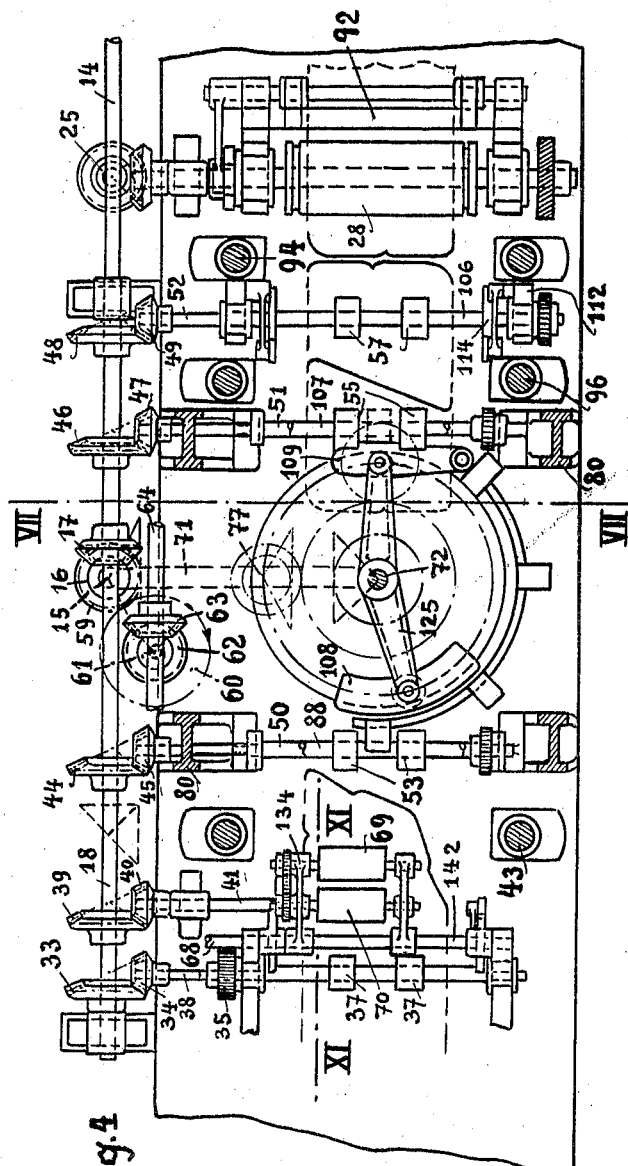
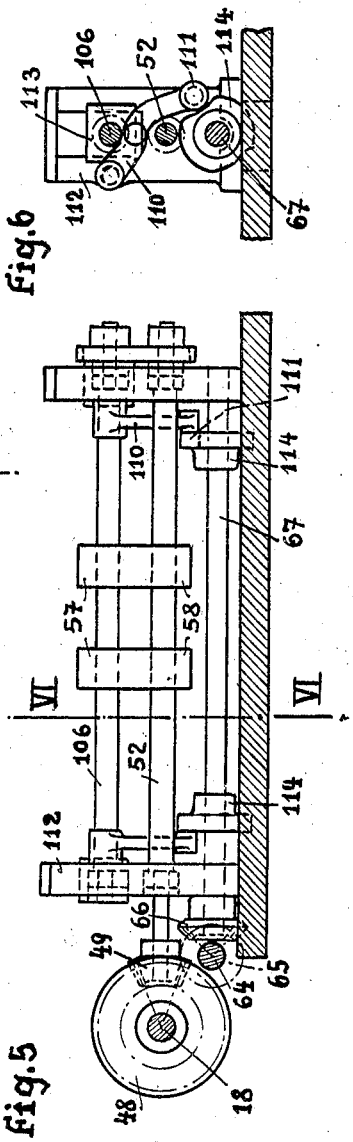

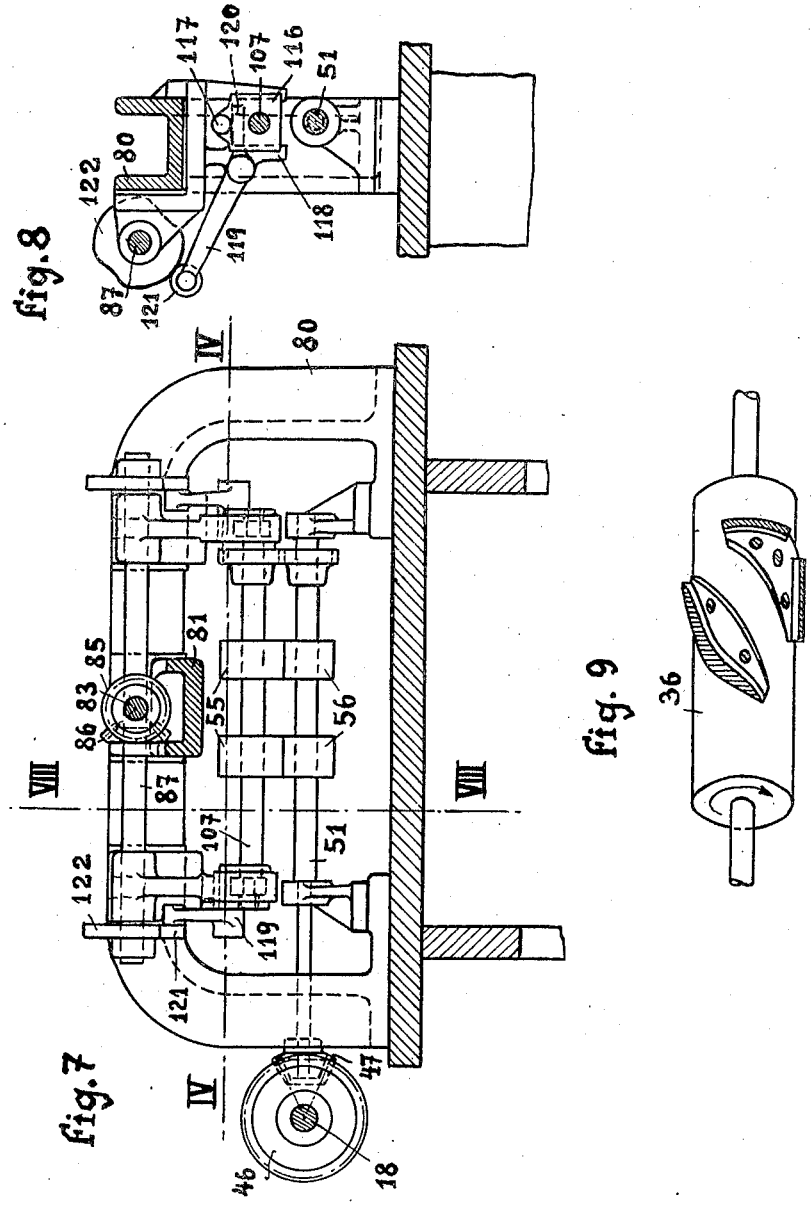

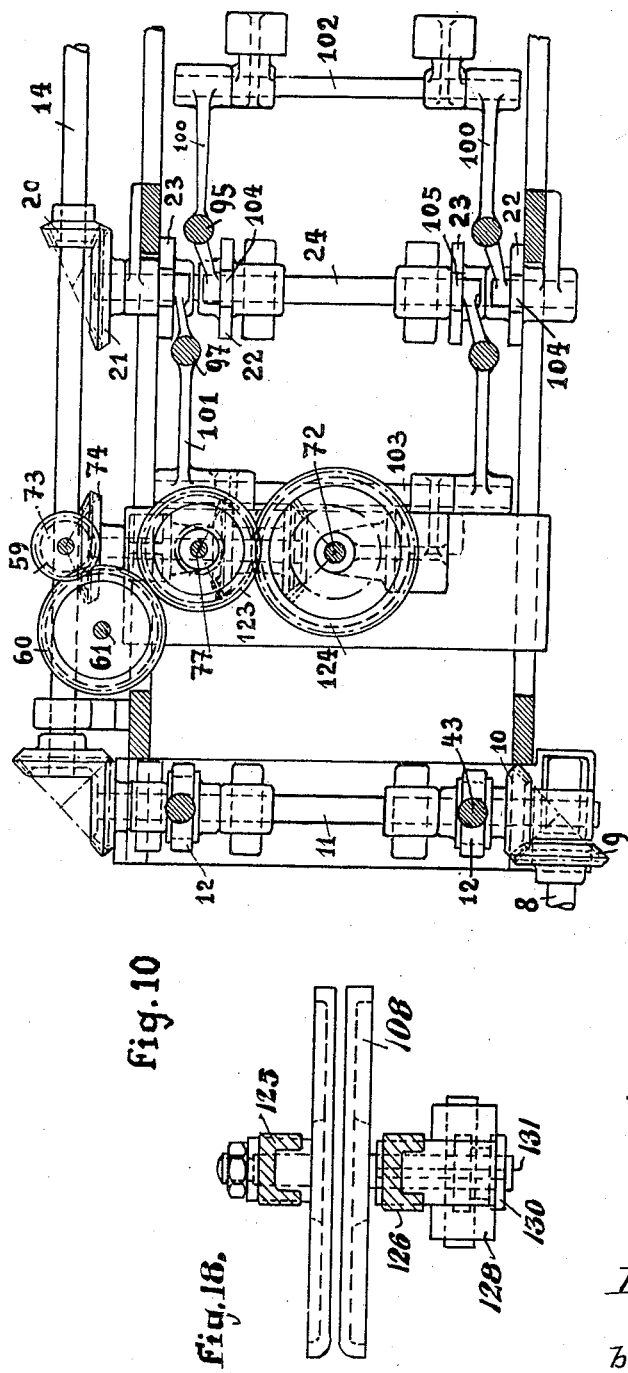
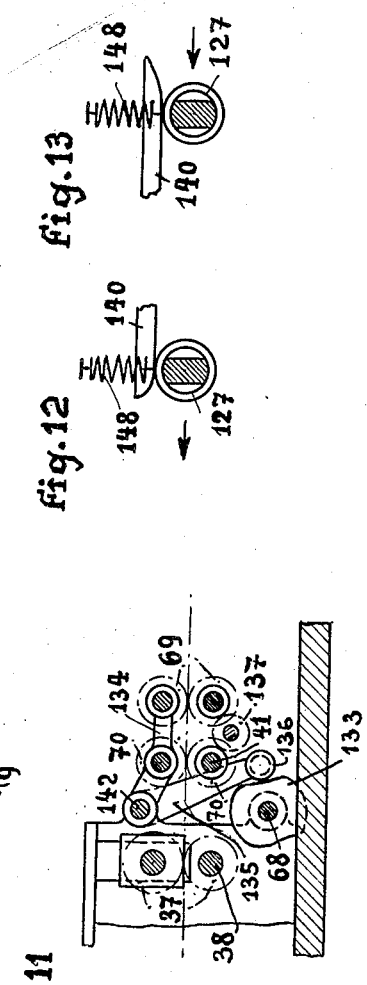

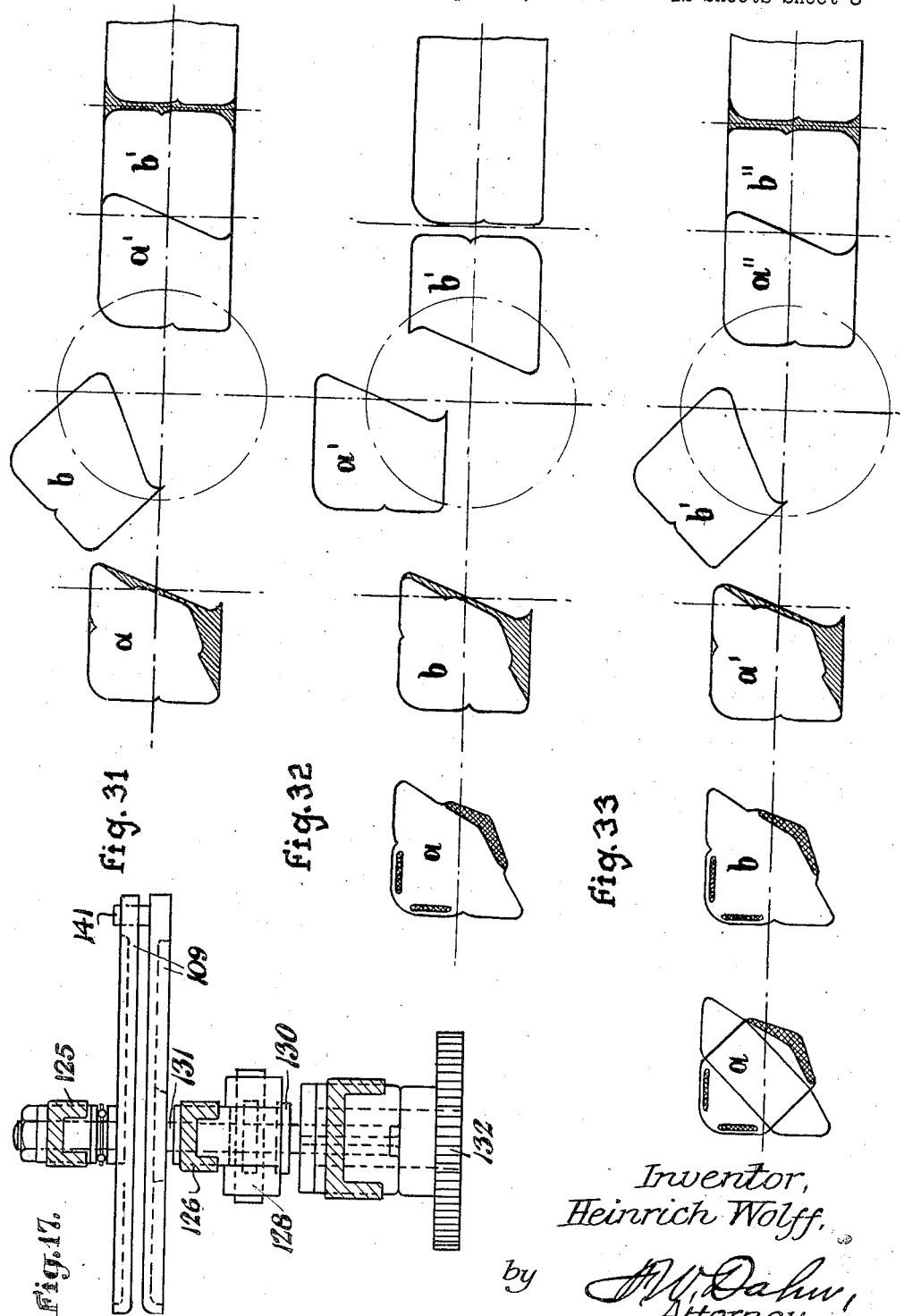

Oct. 6, 1936.  H. WOLFF  2,056,336
ENVELOPE MAKING MACHINE
Filed Sept. 29, 1933  12 Sheets-Sheet 9

Inventor,
Heinrich Wolff,
by [signature],
Attorney.

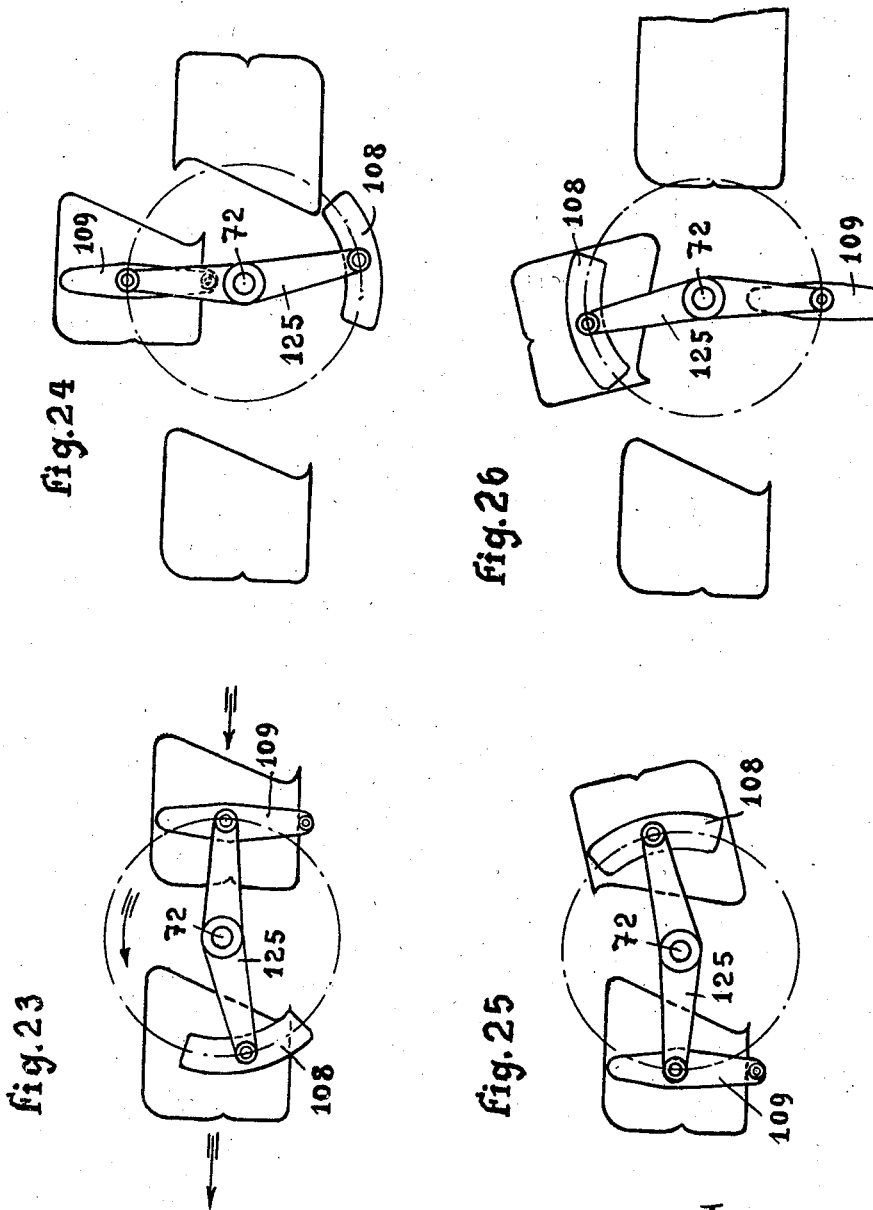

Oct. 6, 1936.  H. WOLFF  2,056,336
ENVELOPE MAKING MACHINE
Filed Sept. 29, 1933    12 Sheets-Sheet 11

Inventor
Heinrich Wolff.
by
Attorney.

Oct. 6, 1936.                H. WOLFF                 2,056,336
                      ENVELOPE MAKING MACHINE
                      Filed Sept. 29, 1933     12 Sheets-Sheet 12

Inventor
Heinrich Wolff.
by
Attorney.

Patented Oct. 6, 1936

2,056,336

UNITED STATES PATENT OFFICE 2,056,336

ENVELOPE MAKING MACHINE

Heinrich Wolff, Berlin, Germany, assignor to Martin Joachimczyk, Berlin-Charlottenburg, Germany Application September 29, 1933, Serial No. 691,535

37 Claims. (Cl. 93—63)

The present invention relates to a machine for making envelopes from a continuous web or strip of material. In manufacturing the so-called high-cut or high-back envelopes from a continuous web, the waste of material is excessively large, if the blanks are cut in the same relative position to the web. Therefore it has been proposed to dispose the cutters in such a manner that the successive adjacent blanks are cut in relatively opposite positions with respect to the web.

The oppositely disposed blanks thereafter are caused by oscillating grippers to assume the same relative position for movement in a uniform path for further operations thereon. The oscillatory movement of the blank turning device reduces the speed of operation of the machine. As all the blanks are turned on the spot with respect to their initial position towards the web, the feeding direction of the turned blanks must be at an angle to the initial feeding direction of the web, whereby the construction of the machine is complicated. Because the blanks are turned on the spot, the speed of turning of the blanks must be very high and a considerable acceleration of the blanks after being cut must take place, so as to space each severed blank from the following blank to prevent the blanks from collision and to ensure an undisturbed turning operation. Such a considerable acceleration of the feed speed is disadvantageous, since the blanks must be abruptly brought to rest at the turning device and therefore a displacement of the blanks from their exact position may easily occur and consequently the blanks must be exactly adjusted before turning.

The object of my invention is to provide in an envelope making machine means for cutting a pair of oppositely disposed blanks from a web, means for feeding the blanks in cooperation with the said cutting means, a blank feeding and turning mechanism adapted to advance a pair of blanks in a given feeding direction and to turn the blanks into the same relative position with respect to the machine and means for advancing the blanks in single file uniformly disposed to a gumming and folding device.

Another object of my invention is to turn the blanks into such a position with respect to the machine, that the turned blanks may be advanced in the same feeding direction as the uncut web. Other novel features of construction and advantages will hereinafter more clearly appear in the detailed description of my invention.

A form of construction of the envelope machine in accordance with the present invention is shown by way of example in the accompanying drawings, in which Fig. 1 is a front elevation of the machine, whilst Fig. 2 is a plan view of the machine in accordance with Fig. 1.

Fig. 3 is a front elevation of the feeding and cutting device on an enlarged scale, whilst Fig. 4 represents a sectional view on the line IV—IV of Fig. 1.

Fig. 5 shows the drive for the two feed-rollers disposed between the two cutting devices seen in the direction of feed of the blanks.

Fig. 6 is a sectional view on the line VI—VI of Fig. 5.

Fig. 7 is a sectional view on the line VII—VII of Fig. 4 including the feed rollers and their drive following the second cutting device.

Fig. 8 represents a section through the device in accordance with Fig. 7 on the line VIII—VIII.

Fig. 9 is a perspective view of the gumming roller.

Fig. 10 shows the cutting devices with the feeding devices situated therebetween in a section on the line X—X of Fig. 3.

Fig. 11 represents the feeding device following the last cutting device in a section on the line XI—XI of Fig. 4.

Figs. 12 and 13 illustrate the guide rolls serving for opening and closing the grippers when running on and off the curve in a sectional view on the line XII—XII of Fig. 15.

Fig. 14 represents a detail view of the feeding and blank turning device disposed after the second cutting device.

Fig. 15 shows on an enlarged scale the gripper at the right-hand side of Fig. 14.

Fig. 16 represents a plan view of the two grippers.

Fig. 17 is a section through the arm carrying the one gripper on the line XVII—XVII of Fig. 14.

Fig. 18 is a section through the opposite arm carrying the other gripper on the line XVIII—XVIII of Fig. 14.

Figs. 23–26 represent the corresponding positions of the grippers and the blanks when passing through the turning device.

Figs. 27–33 represent the gradual cutting and feeding of the blanks after each revolution of the main driving shaft.

Figure 20:
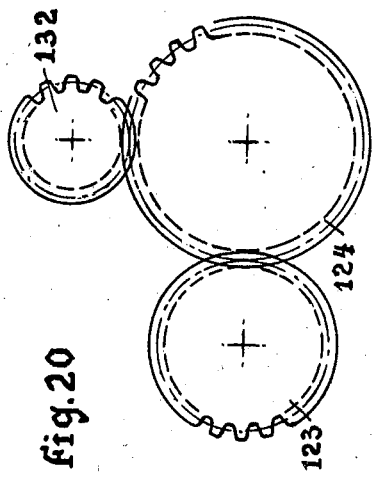
Figs 19–22 illustrate the movement of the gears driving the feeding device according to Fig. 14.
Figure 22:
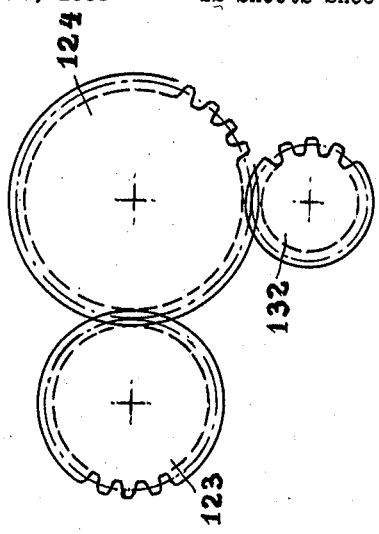
Figure 19:
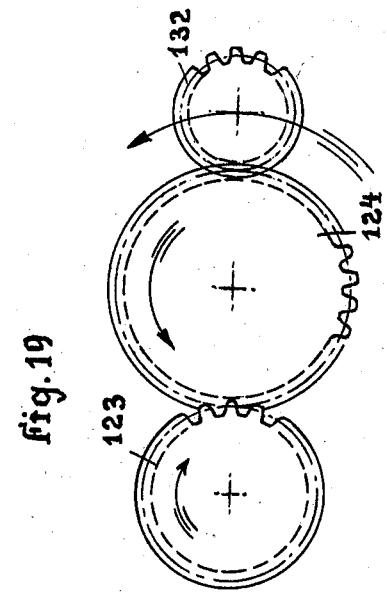
Figure 21:
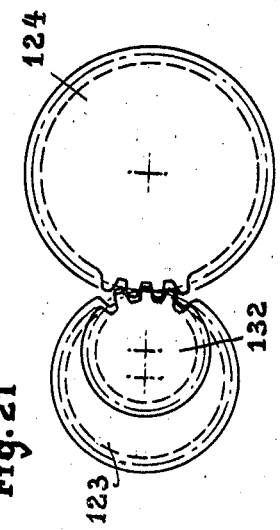

The envelope machine, represented in the accompanying drawing and consisting of a printing device, a cutting device, a gumming device and a folding device together with the feeding means appertaining thereto, is actuated by a belt running on a belt pulley 1. The shaft 2, on which the belt pulley has been placed, is disposed within the machine frame 3 of the folding device for the purpose of driving, through the medium of gear wheels 4 and 5, an intermediate shaft 8 provided with two ball-joints 6 and 7, said intermediate shaft 8 driving in its turn a transverse shaft 11 by means of cone or bevel wheels 9, 10. With the aid of two cams 12 (Fig. 3) a cutting device 13 is actuated from this shaft 11, giving to the envelope blanks, previously placed in their proper position, their final shape. The other end of the shaft 11 is made to carry a cone or bevel wheel driving a cone or bevel wheel disposed on a longitudinal shaft 14. From the longitudinal shaft 14 via a cone or bevel wheel gearing and a vertical shaft 15, as well as a second cone or bevel wheel gearing 16, 17 (Figs. 2 and 4) a longitudinal shaft 18, situated above the shaft 14, is driven.

The shaft 14, being provided at its free end with a hand wheel 19, drives, moreover, via a cone or bevel gearing 20, 21 (Fig. 10) a transverse shaft 24, provided with cams 22, 23, via a vertical intermediate shaft 25 (Figs. 2 and 4) the driving shaft 26 of the feed rollers 28, 29 (Fig. 1), situated in front of the first cutting device 27; and via further intermediate shafts, the uniformly revolving feed rollers 30, positioned behind the printing units and finally, the printing units 31, 32 themselves. From the upper longitudinal shaft 18 a transverse shaft 38, carrying the continuously feeding feed rollers 37 and driving the gumming device 36 via a gear wheel 35, is made to revolve by means of a bevel-gearing 33, 34 (Fig. 4), and by means of cone or bevel wheels 39, 40 the driving shaft 41 of intermittently working feed rollers 69, 70 (Fig. 11). Furthermore, from the shaft 18, the driving shafts 50, 51 and 52 of the intermittently working feed rollers 53, 54 or 55, 56 and 57, 58 (Fig. 4) are driven through the medium of cone or bevel wheel gearings 44, 45 or 46, 47 or 48, 49. The longitudinal shafts 14 and 18 are made to revolve at the same identical speed as the shafts 2 and 8, whilst the shafts of the feed rollers, driven by the longitudinal shaft 18, are all made to revolve at the ratio of 1:2.

From the intermediate shaft 15 a short shaft 61, positioned within the machine frame 3, is driven at the ratio of 2:1 by means of the gear wheels 59, 60, whilst from said short shaft a longitudinal shaft 64 (Figs. 4 and 5) is made to revolve at the same speed by means of a cone or bevel wheel gearing 62, 63, said longitudinal shaft 64 driving in its turn by means of the cone or bevel wheels 65, 66 a cam shaft 67 intended for the control of the intermittent feed of the feed rollers 57, 58. The same shaft 64 is also made to drive the cam shaft 68 for the control of the intermittent feed of the feed rollers 69, 70 positioned behind the last cutting device. The grippers adjusting the blanks are driven from the vertical shaft 15 and that by means of a transverse shaft 71 and a vertical shaft 72 (Fig. 14). The drive of the transverse shaft 71 is effected by means of the cone or bevel wheels 73, 74, whilst between the shafts 71 and 72 cone or bevel wheels 75, 76 have been provided (Fig. 14). The shaft 71 drives, moreover, a vertical shaft 77 by means of cone or bevel wheels 78, 79 at a rotary speed which corresponds to the speed of the shafts 15 and 14. The upper part of the shaft 72, positioned in a bridge 81 (Figs. 3 and 7) connecting two cross beams 80, carries above said bridge a cone or bevel wheel 82 (Fig. 14), meshing with a cone or bevel wheel 84 fixed on a short longitudinal shaft 83. On both ends of shaft 83 supported by the connecting bridge 81, cone or bevel wheel gearings 85, 86 (Fig. 3) have been provided for the purpose of driving the cam shafts 87 for the intermittent feed of the feed rollers 55 and 53 respectively disposed on the shaft 107 and 88 respectively (Figs. 4 and 7).

The paper web 89, to be converted into envelopes, is uniformly drawn from a roll 90 by means of two feed rollers 30 driven from the shaft 14 by means of an intermediate shaft and printed by means of the two printing units 31 and 32, if this should be required. For the purpose of neutralizing the stowing of the paper web caused by the intermittent working of the cutting device 27, a tension roll 91, regulating the size of a paper web loop, has been positioned between the feed rollers 30 and the intermittently working feed rollers 28, 29, the tension roll placed directly in front of the cutting device 27. The feed rollers 28, 29, carried by the shafts 26, are of segmental shape (see Fig. 3), so that they release the web during the cutting operation. In front of the feed rollers a pressure bar 92, preferably covered with vulcanite is provided for the purpose of attaining an accurate feed-length. The bar 92 arrests the paper web 89 for a period during which the rollers 28, 29 do not feed or transport said paper web 89. The pressure bar 92 is controlled by means of a lever 138, carrying a cam roll 115 said roll running on a cam 139.

The first cutting device 27 cuts a strip, having the length of two blanks, off the paper web, whilst simultaneously the second cutting device 93 separates the two blanks. The cutting devices 27 and 93 are actuated by the same cam shaft 24. The cutter beam of the cutting device 27, fixed on guide bars 94 by means of screws, is raised or lowered through the medium of bars 95 (Figs. 3 and 10), whilst the cutter beam of the cutting device 93 screwed on guide bars 96, is actuated by means of bars 97. The bars 95 and 97 are jointed by intermediate elements 98, 99 to rocking levers 100, 101, adapted to be rocked about the pivots 102 or 103, their free ends resting on the cams 22, 23 of the shaft 24, each free end being provided with a cam roll 104 or 105. In view of the fact that this shaft is driven from the longitudinal shaft 14 at the ratio of 2:1 it is obvious that the cutter beams will be lowered at every second revolution of the machine shaft.

When the blanks have been cut by means of the cutting device 27, the paper web will be fed during the next revolution of the main drive shaft through the medium of the segmental feed rollers 28 and 29 by the length of one blank. Towards the end of this revolution of the machine shaft, the front edge of the paper web, cut by means of the cutters of the cutting device 27, will be approximately situated in the central plane of the second cutting device 93. During the revolution of the main drive shaft which now follows, the cutting devices 27 and 93 will not be actuated and for this reason, they will not perform any cutting operations, whereas the paper web will be moved forward by the same feed length through the medium of the feed rollers 28, 29. The cutting itself is perfected in a shearing manner by a vertical movement of the upper cutting knives against the fixed lower cutting knives.

Owing to the actuation of the cutting devices 27 and 93 towards the end of the second revolution of the machine shaft, two blanks, placed to each other at an angle of 180° are then cut out of the web and fed by means of intermittently working feed-rollers 57, 58 and 55, 56 respectively disposed on shafts 106 or 52 and 51 or 107 respectively to a feeding device, where the adjustment of the blanks is effected by means of grippers 108, 109.

The feed rollers 57 and 58, actually revolving uninterruptedly are made to feed intermittently in consequence of the fact, that the upper rollers 57 with their shaft 106 are temporarily raised by the lever 110 engaging the two ends of said shaft 106. The levers, carrying at their free end a cam roll 111 are pivotally mounted on a pedestal 112 in a slot of which the bearing 113 of the shaft 106 is adapted to be displaced in a vertical direction. The cam rolls 111 resting against a cam 114 of the cam shaft 67, are raised and lowered by this cam (Figs. 5 and 6).

The modus of controlling the feed rollers 55, 56 following the second cutting device 93 and the feed rollers 53, 54, constructed in an identical manner, will be seen from Figs. 7 and 8. The shaft 51 of the lower feed rollers 56 is fixed within the machine frame, whilst the shaft 107 of the upper feed rollers 55 is adapted to revolve in a bearing capable of being displaced in a vertical direction, the latter carrying at its upper end a guide roll 117. The bearing 116 is adapted to be displaced within a pedestal carrying a pivoting double-armed lever 119, 120. The arm 120 of the double-armed lever is made to catch below the guide roll 117 whilst the other arm 119 is made to rest with its cam roll 121 against a cam 122 carried by the shaft 87 and being adapted to control the intermittent feed of the rollers 53, 54, 55, 56 by raising and lowering the bearing of the upper roller.

The modus operandi of the arrangement intended for the adjustment of the blanks will be gathered from Figs. 14 to 35. The shaft 77, positioned within the machine frame, is made to carry at its upper end a gear wheel 123, meshing with a gear wheel 124 loosely running on the shaft 72. The ratio of gear between the gear wheels 123 and 124 equals 4:3, whilst that between the shafts 77 and 72 equals 2:1. Upon the shaft 72 two cross heads 125 and 126 are so positioned as to be parallel to each other, carrying at their ends on the sides facing each other, the grippers 108 and 109. The grippers 108 are non-rotatably mounted in the cross heads, whilst the grippers 109 are adapted to be rotated around their axis. The opening and closing operation of the grippers is controlled by means of a cam path 140 (Figs. 4, 12, 13 and 15). A pivoted lever 128, attached to the cross head 126 is made to rest under the action of a spring 148 with its roll 127 against this cam path. The pivoted lever engages with a pin 129 a coupling sleeve 130 of the supporting axis 131 of the lower gripper 108 or 109, opening the grippers when passing along the cam path 140, by displacing the lower grippers in a downward direction and closing the grippers when the cam at its other end allows the spring 148 to press the lower against the upper gripper. The lower gripper 109, adapted to be rotated around its axis 131, carries at its end a pin 141 which is slidable in a hole of the upper gripper 109 also capable of being rotated about its axis (Figs. 15, 16 and 17). Upon a rotation of the supporting axis 131 of the lower gripper 109, the pin 141 simultaneously, and at the same speed, takes the upper, rotatable gripper 109 along with it, so that both grippers are positioned parallel to each other in any position of the cross heads 125, 126.

Figure 35:
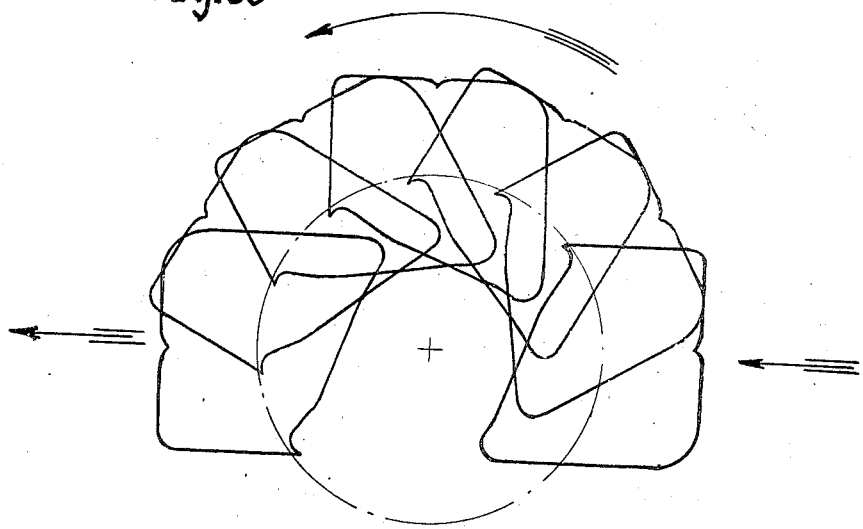
Fig. 35 represents a gradual forward movement of a blank not turned with regard to the grippers.

The supporting axis 131 of the gripper 109 carries at its lower end a gear wheel 132, meshing with the loosely running gear wheel 124 (Fig. 14). When the gear wheel 123 is made to describe an angular movement of 180° (vide Figs. 19-22), the gear wheel 124 will be made to describe one of 135° and at the same time the cross heads 125, 126 are displaced, together with the shaft 72, by 90°. In view of the fact, that the ratio of gear between the gear wheels 124 and 132 equals 1:2, the gear wheel 132 will consequently maintain its angular position in relation to the machine frame, i. e. the grippers 109, although turned around the shaft 72 by 90°, maintain however their angular position with respect to the machine, so that the blanks gripped by them are fed forwards in a circular path (Fig. 34) without changing their angular position in relation to the feeding direction of the paper web. After the grippers have been displaced by 180°, they will be opened, whereupon the blanks seized by the grippers 109 will be, it is true, displaced by the diameter of the gripper path in a longitudinal direction of the machine, but otherwise they will be in exactly the same position in which they have been picked up, whilst the blanks seized by the grippers 108 are advanced in the same circular path and further take part in the turning movement of the cross head, being thereby turned by 180° (Fig. 35).

After the blanks have been swung by the grippers in an identical position to the machine and to each other, they will be transported by the feed rollers 53, 54, whose modus operandi is identical with that of the feed rollers 55, 56, to a third cutting device 13 and to the intermittently working roller pairs 69, 70. These rollers feed the blanks into exact position with respect to the cutting device 13, where the final shape of the blanks is cut, but release them during the cutting operation. After the cutting the intermittently working rollers are feeding the blanks to the uninterruptedly working feed roller pair 37 whence they are fed by the latter to the gumming roller 36.

As already previously mentioned, the cutting device 13 will be actuated directly from the transverse shaft 11 by means of two cams, so that the cutter beam, fastened by screws to the guide bars 43, is once raised and lowered by means of the bars 42 at each revolution of the machine shaft.

The control of the feed rollers 69, 70 disposed close behind the cutting device 13, is effected, as already mentioned, by means of the shaft 68, i. e. with the aid of cams 133. The axes of the upper feed rollers are positioned in the one arm 134 of a double-armed lever pivoted on its axis 142 whilst the other arm 135 of the latter is made to rest against the cam by means of a cam roll 136, being raised and lowered by the cam once at each revolution of the machine shaft. On the driven shaft 41 of the lower feed rollers 70 a gear wheel has been keyed which with the aid of an intermediate wheel 137 is made to mesh with a gear wheel supported by the shaft of the lower feed roller 69. Both pairs of feed rollers are revolving, for that reason, at the same speed. In the gumming device which, as already previously mentioned, is actuated by the gear wheel 35 of the shaft 38, the blanks are gummed by means of a revolving gumming roller 36 (Fig. 9).

A pair of feed rollers 143 thereupon feeds the blanks to the folding box 144, into which they are pressed by means of a plunger 145 driven in a known manner. Thereupon the reversal of the flaps is effected within the folding chamber in a known manner. After the termination of the folding operation the envelopes are made to drop on a circulating chain provided with links 146, so that in this chain the gummed seal flaps can be dried. After being dried the ready envelopes are piled up on a delivery table 147.

Figure 27:
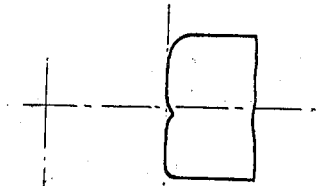
Figure 28:
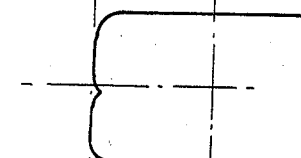
Figure 29:
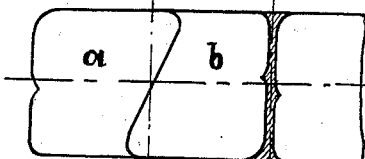
Figure 30:
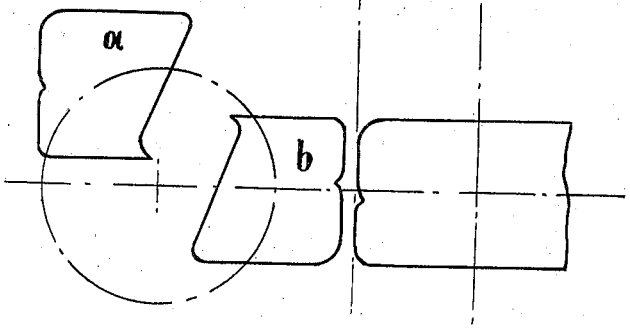
Figure 34:
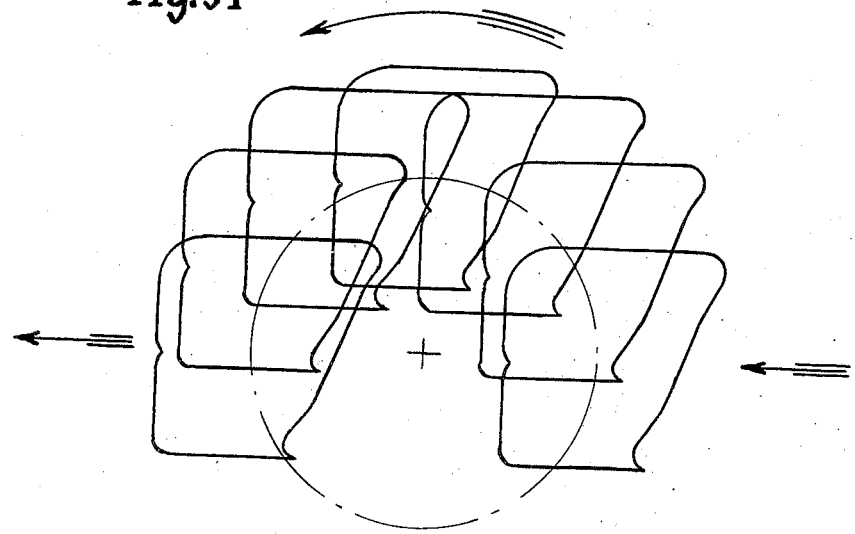
Fig. 34 represents the gradual forward movement of a blank not turned when compared with its original position, whilst

The Figs. 27–33 elucidate the stepwise effected production of the envelopes. The knife of the cutting device 27 separates the blank from the paper web and simultaneously cuts the front part of the web in accordance with the required shape the blank is to have (Fig. 27). During the next revolution of the machine shaft the front part of the paper web is fed below the second cutting device 93 (Fig. 28). It is only at the next revolution, after the web has been fed forward by the same distance, that the blank $a$ lying in front is separated from the paper web by the knife of the cutting device 93 and simultaneously the second blank $b$ is cut out by means of the cutting device 27 (Fig. 29). On raising the cutter beam the first blank $a$ will already be fed to the grippers 109 by means of the feed rollers 55, 56 said grippers taking the blank along with it without changing its position in relation to the machine, whilst the feed rollers 55, 56 are taking over the second blank $b$ from the feed rollers 57, 58 for the purpose of forwarding it to the grippers 108 (Fig. 30). At the end of the next revolution of the machine shaft the grippers 109 have passed their blank $a$ on to the cutting device 13 cutting out the exact shape of the blank. The following blank $b$ has been turned round the shaft 72 with the grippers 108 and the next blanks $a'$, $b'$ will be cut out (Fig. 31).

After a further revolution of the machine shaft the first blank $a$ will have been passed into the gumming device, whilst the second blank $b$, the position of which, owing to the angular displacement of 180°, corresponds exactly to the position of the first blank, is cut to its exact shape by the cutting device 13 (Fig. 32). The blanks $a'$, $b'$ are occupying the same position as the blanks $a$, $b$ in Fig. 30, whilst during the following revolution of the machine shaft the blanks $a''$ and $b''$ are cut out (Fig. 33).

Owing to the special design of the feeding device in accordance with the present invention it will be possible, to feed the blanks along the same direction of feed as the paper web towards the cutting, gumming and folding devices. As the blanks are turned while being advanced on a circular path and not while stationary, no acceleration of the feed of the blanks need take place before they are turned, and the speed of turning may be extremely reduced, as the turning movement may continue until the blanks have been fed to the opposite end of the turning device. Regarding the special construction of the working devices and the manner in which they operate there is an essential simplification of the envelope machine and its driving means and a considerable increase of its capacity. As the large cut of the oblique edge of the blanks, that in the final envelope forms the contour of the closing flap and the two adjacent edges of the gore shaped side flaps, is made after turning the blanks, a single cutter may be used for cutting these edges of the blanks instead of two cutters in the case of cutting before turning the oppositely disposed blanks into the same relative positions with respect to the machine. By this fact further a completely uniform shape of the successive blanks is ensured. In consequence of the positive feed by means of revolving feeding elements during all the working phases of the machine, a repeated adjustment of the blanks has been rendered unnecessary and the attainment of most exact envelope shapes in conjunction with maximum output will be guaranteed.

I claim:

1. In an envelope making machine, means for unrolling a web from a roll, means for cutting a pair of envelope blanks, cutting edges on these means adapted to sever the blanks, said edges being arranged to cut the blanks in different disposition, means for feeding the blanks in cooperation with the said cutting means, another blank feeding mechanism adapted to advance the pair of blanks in a circular feeding direction and to bring the blanks into a uniform relative position with respect to the machine, a gumming device and a folding device and means for advancing the blanks in single file to the said gumming and folding devices.

2. In an envelope making machine, means for unrolling a web from a roll, means for cutting a pair of envelope blanks, cutting edges on these means adapted to sever the blanks, said edges being arranged to cut the blanks in different disposition, means for feeding the blanks in cooperation with the said cutting means, another blank feeding mechanism adapted to advance the pair of blanks in a circular feeding direction and to turn the one blank of the said pair of blanks around the centre of its circular path and the other blank around the aforesaid centre and an axis rotating around said centre, a gumming device and a folding device and means for advancing the blanks in single file to the said gumming and folding devices.

3. In an envelope making machine, means for unrolling a web from a roll, means for cutting a pair of oppositely disposed envelope blanks, means for feeding the blanks in cooperation with the said cutting means, another blank feeding mechanism adapted to advance the pair of blanks in a circular feeding direction and to turn the one blank of the said pair of blanks around the centre of its circular path through an angle of 180° and the other blank also about an angle of 180° around the aforesaid centre and an axis rotating around said centre, a gumming device and a folding device and means for advancing the blanks in single file to the said gumming and folding devices.

4. In an envelope making machine, means for unrolling a web from a roll, means for partially cutting a pair of oppositely disposed envelope blanks, means for feeding the blanks in cooperation with the said cutting means, another blank feeding mechanism adapted to advance the pair of blanks in a circular feeding direction and to turn the one blank of the said pair of blanks around the centre of its circular path through an angle of 180° and the other blank also about an angle of 180° around the aforesaid centre and an axis rotating around said centre, other cutting means for completely cutting the uniformly disposed blanks, a gumming and a folding device, and means for advancing the blanks in alinement to the running direction of the web in single file to the gumming and folding devices.

5. In an envelope making machine, means for unrolling a web from a roll, means for partially cutting a pair of oppositely disposed envelope blanks, means for feeding the blanks in cooperation with the said cutting means, two pairs of grippers mounted on rotating supports adapted to advance the blanks in a circular path, means for continuously driving said supports, means for slidably guiding one of the grippers of each pair, means for adjusting the operation of said grippers, means for turning the grippers into the same relative position with respect to the machine, means for feeding the blanks after being released by said grippers to other cutting means for completely cutting the blanks, a gumming and folding device and means for advancing the blanks in alinement to the running direction of the web in a single file to the gumming and folding device.

6. In an envelope making machine, means for unrolling a web from a roll, means for partially cutting a pair of oppositely disposed envelope blanks, means for feeding the blanks in cooperation with the said cutting means, two pairs of grippers mounted on rotating supports adapted to advance the blanks in a circular path, means for continuously driving said supports, one of which has pivoted to it two links adapted to be raised and lowered by means of a guide cam and a spring and to act upon slidable axes carrying one of the grippers of each pair, means for turning the grippers into the same relative position with respect to the machine, means for feeding the blanks after being released by said grippers to other cutting means for completely cutting the blanks, a gumming and folding device and means for advancing the blanks in alinement to the running direction of the web in a single file to the gumming and folding device.

7. In an envelope making machine, means for unrolling a web from a roll, means for partially cutting a pair of oppositely disposed envelope blanks, means for feeding the blanks in cooperation with the said cutting means, two pairs of grippers mounted on rotating supports adapted to advance the blanks in a circular path, means for continuously driving said supports, one of which has pivoted to it two links adapted to be raised and lowered by means of a guide cam and a spring and to act upon slidable axes carrying one of the grippers of each pair, a gear wheel keyed to one of the slidable axes to drive said axis at such a speed that the blank caught by the adjunct gripper is turned into the same relative position with respect to the machine as the blank held by the other gripper pair, means for feeding the blanks after being released by said grippers to other cutting means for completely cutting the blanks, a gumming and folding device and means for advancing the blanks in alinement to the running direction of the web in a single file to the gumming and folding device.

8. In an envelope machine, means for unrolling a web from a roll, means for partially cutting a pair of oppositely disposed envelope blanks, means for feeding the blanks in cooperation with the said cutting means, two pairs of grippers mounted on rotating cross heads adapted to advance the blanks in a circular path, a driving shaft supporting said cross heads, one of which has pivoted to it two links adapted to be raised and lowered by means of a guide cam and a spring and to act upon slidable axes carrying one of the grippers of each pair, an intermediate gear wheel loosely mounted on the driving shaft of the cross heads and engaging another gear wheel keyed to one of the slidable axes, means for driving said gear wheels at such a speed that the blank caught by the adjunct gripper is turned into the same relative position with respect to the machine as the blank held by the other gripper pair, means for feeding the blanks after being released by said grippers to other cutting means for completely cutting the blanks, a gumming and a folding device and means for advancing the blanks in alinement to the running direction of the web in single file to the gumming and folding devices.

9. In an envelope machine, means for unrolling a web from a roll, means for partially cutting a pair of oppositely disposed envelope blanks, means for feeding the blanks in cooperation with the said cutting means, two pairs of grippers mounted on rotating cross heads adapted to advance the blanks in a circular path, a driving shaft supporting said cross heads, one of which has pivoted to it two links adapted to be raised and lowered by means of a guide cam and a spring and to act upon slidable axes carrying one of the grippers of each pair, an intermediate gear wheel loosely mounted on the driving shaft of the cross heads and engaging another gear wheel keyed to one of the slidable axes, a second driving shaft adapted to be driven by the parallel driving shaft of the cross heads by means of a gearing and to drive by means of a fixed gear wheel the intermediate gear wheel and the gear wheel mounted on the rotatable gripper axis at such a speed that the blank caught by the adjunct gripper is turned into the same relative position with respect to the machine as the blank held by the other gripper pair, means for feeding the blanks after being released by said grippers to other cutting means for completely cutting the blanks, a gumming and a folding device and means for advancing the blanks in alinement to the running direction of the web in single file to the gumming and folding devices.

10. In an envelope machine, means for unrolling a web from a roll, means for partially cutting a pair of oppositely disposed envelope blanks, means for feeding the blanks in cooperation with the said cutting means, two pairs of grippers mounted on rotating cross heads adapted to advance the blanks in a circular path, a driving shaft supporting said cross heads, one of which has pivoted to it two links adapted to be raised and lowered by means of a guide cam and a spring and to act upon slidable axes carrying one of the grippers of each pair, an intermediate gear wheel loosely mounted on the driving shaft of the cross heads and engaging another gear wheel keyed to one of the slidable axes, a pin mounted on the gripper of the last named slidable and rotatable axis, said pin slidably entering a hole of the other gripper of this pair to ensure a uniform rotation of these cooperating grippers, a second driving shaft adapted to be driven by the parallel driving shaft of the cross heads by means of a gearing and to drive by means of a fixed gear wheel the intermediate gear wheel and the gear wheel mounted on the rotatable gripper axis at such a speed that the blank caught by the adjunct gripper is turned into the same relative position with respect to the machine as the blank held by the other gripper pair, means for feeding the blanks after being released by said grippers to other cutting means for completely cutting the blanks, a gumming and a folding device and means for advancing the blanks in alinement to the running direction of the web in single file to the gumming and folding devices.

11. In an envelope making machine, means for unrolling a web from a roll, means for partially cutting a pair of oppositely disposed blanks from the web, means for feeding the blanks in cooperation with the said cutting means, a continuously driven shaft carrying two superimposed cross heads bearing at their one end a pair of non-rotatable grippers and at their opposite end a pair of rotatable grippers, means for closing and opening said grippers to grip and release the blanks, the grippers being adapted to turn the blanks into a uniform relative position with respect to the machine, means for rotating the shaft of the cross heads in cooperation with the blank cutting and feeding means, means for feeding the blanks after being released by said grippers to other cutting means for completely cutting the blanks, a gumming and a folding device and means for advancing the blanks in alinement to the running direction of the web in single file to the gumming and folding devices.

12. In an envelope making machine, means for unrolling a web from a roll, means for tensioning the web, means for intermittently feeding the web in cooperation with cutting devices, a first cutting device adapted to separate with a little waste a pair of oppositely disposed envelope blanks from the web at two lines corresponding to the subsequent outlines of the adjacent blanks positioned at both sides of the waste cut out, a second cutting device adapted to cut the pair of blanks into two uniform but oppositely disposed blanks, a blank feeding and turning mechanism adapted to effect a uniform disposition of the blanks, means for feeding the blanks in cooperation with the said cutting devices to the blank feeding and turning mechanism, and means for advancing the uniformly shaped and disposed blanks to a third cutting device for completely cutting the blanks and to means for forwarding the blanks in a single file to a gumming and a folding device.

13. In an envelope making machine, means for unrolling a web from a roll, means for tensioning the web, means for intermittently feeding the web in cooperation with cutting devices, means for holding the web in an exact unvaried position during cutting, when the web is released by the intermittently acting feeding means, a first cutting device adapted to separate with a little waste a pair of oppositely disposed envelope blanks from the web at two lines corresponding to the subsequent outlines of the adjacent blanks positioned at both sides of the waste cut out, a second cutting device adapted to cut the pair of blanks into two uniform, but oppositely disposed blanks, a blank feeding and turning mechanism adapted to effect a uniform disposition of the blanks, means for feeding the blanks in cooperation with the said cutting devices to the blank feeding and turning mechanism, means for advancing the uniformly shaped and disposed blanks to a third cutting device for completely cutting the blanks and to means for forwarding the blanks in a single file to a gumming and a folding device.

14. In an envelope making machine, blank cutting means containing cutting edges adapted to sever the blanks, said edges being arranged to cut the blanks in different disposition, gumming and folding means, and means for advancing the blanks in any given feeding direction and for bringing the blanks in the course of the feeding motion into a uniform relative position with respect to the machine.

15. In an envelope making machine, blank cutting means containing cutting edges adapted to sever the blanks, said edges being arranged to cut the blanks in different disposition, gumming and folding means, means for advancing the blanks in any given feeding direction and means cooperating with said feeding means for bringing the blanks in the course of the feeding motion into a uniform relative position with respect to the machine.

16. In an envelope making machine, means for unrolling a web from a roll, blank cutting means containing cutting edges adapted to sever the blanks, said edges being arranged to cut the blanks in different disposition, gumming means, means for feeding the blanks in cooperation with the said cutting means, other blank feeding means adapted to advance the pair of blanks in a given feeding direction and to bring in the course of the feeding motion the blanks into a uniform relative position with respect to the machine, a folding device and means for advancing the uniformly disposed blanks in single file to said folding device.

17. In an envelope making machine, means for cutting oppositely disposed envelope blanks, gumming and folding means, means for effecting a uniform relative position of the blanks with respect to the machine adapted to advance the blanks and to turn in the course of the feeding motion the one cut of each pair of blanks into the same position as that of the other blank when being cut and to keep the other blank in its original position.

18. In an envelope making machine, means for cutting oppositely disposed envelope blanks, gumming and folding means, means for advancing the blanks in any given feeding direction and means cooperating with said feeding means for bringing the blanks in the course of the feeding motion into a uniform relative position with respect to the machine adapted to turn the one cut of each pair of blanks into the same position as that of the other blank when being cut and to keep the other blank in its original position.

19. An envelope-blank cutting and turning mechanism for envelope making machines comprising blank cutting means containing cutting edges adapted to sever the blanks, said edges being arranged to cut the blanks in different disposition, and means for advancing the blanks in any given feeding direction and for bringing the blanks in the course of the feeding motion into a uniform relative position with respect to the machine.

20. An envelope-blank cutting and turning mechanism for envelope making machines comprising blank cutting means containing cutting edges adapted to sever the blanks, said edges being arranged to cut the blanks in different disposition, means for advancing the blanks in any given feeding direction and means cooperating with said advancing means for bringing the blanks in the course of the feeding motion into a uniform relative position with respect to the machine.

21. An envelope-blank cutting and turning mechanism for envelope making machines comprising blank cutting means containing cutting edges adapted to sever the blanks, said edges being arranged to cut the blanks in different disposition, and blank feeding means adapted to advance the blanks in circular feeding direction and to bring the blanks into a uniform relative position with respect to the machine.

22. An envelope-blank cutting and turning mechanism for envelope making machines comprising means for cutting oppositely disposed envelope blanks, means for effecting a uniform relative position of the blanks with respect to the machine, said means being adapted to advance the blanks and to turn in the course of the feeding motion the one series of uniformly disposed cuts of the pairs of blanks into the same position as that of the other blanks when being cut and to keep these other blanks in their original position.

23. An envelope-blank cutting and turning mechanism for envelope making machines comprising means for cutting oppositely disposed envelope blanks, means for advancing the blanks in any given feeding direction and means cooperating with said feeding means for turning the blanks in the course of the feeding motion into a uniform relative position with respect to the machine, said means being adapted to turn the one series of uniformly disposed cuts of the pairs of blanks into the same position as that of the other blanks when being cut and to keep these other blanks in their original position.

24. An envelope-blank cutting and turning mechanism for envelope making machines comprising means for unrolling a web from a roll, means for cutting a pair of oppositely disposed envelope blanks, means for feeding the blanks in cooperation with the said cutting means, other blank feeding means adapted to advance the pair of blanks in circular feeding direction and to turn the one blank of the said pair of blanks around the centre of its circular path and the other blank around the aforesaid centre and around an axis rotating around said centre into a uniform relative position with respect to the machine.

25. In an envelope making machine, blank cutting means containing cutting edges adapted to sever the blanks, said edges being arranged to cut the blanks in different disposition, means for advancing the blanks in a common plane, and a unidirectionally rotating device provided with means for bringing the blanks into a uniform relative position with reference to the machine.

26. In an envelope making machine, blank cutting means containing cutting edges adapted to sever the blanks, said edges being arranged to cut the blanks in different disposition, means for advancing the blanks in a common plane, and a unidirectionally rotating orienting device for putting all the blanks into homologous relation for further treatment.

27. An envelope-blank cutting and turning mechanism for envelope making machines comprising blank cutting means containing cutting edges adapted to sever the blanks, said edges being arranged to cut the blanks in different disposition, other cutting means for completely cutting the blanks, means for advancing the blanks in any given feeding direction and for bringing the blanks in the course of the feeding motion into a uniform relative position with respect to the machine.

28. An envelope-blank cutting and turning mechanism for envelope making machines comprising blank cutting means containing cutting edges adapted to sever the blanks, said edges being arranged to cut the blanks in different disposition, other cutting means for completely cutting the blanks, means for advancing the blanks in any given feeding direction and means cooperating with said feeding means for bringing the blanks in the course of the feeding motion into a uniform relative position with respect to the machine.

29. An envelope-blank cutting and turning mechanism for envelope making machines comprising blank cutting means containing cutting edges adapted to sever the blanks, said edges being arranged to cut the blanks in different disposition, other cutting means for completely cutting the blanks, means for effecting a uniform relative position of the blanks with respect to the machine, said means being adapted to advance the blanks and to turn, in the course of the feeding motion, the one series of uniformly disposed cuts of the pairs of blanks into the same position as that of the other blanks when being cut and to keep these other blanks in their original position.

30. An envelope blank cutting and turning mechanism for envelope making machines comprising blank cutting means containing cutting edges adapted to sever the blanks, said edges being arranged to cut the blanks in different disposition, means for advancing the one series of uniformly disposed cuts in any given feeding direction and for bringing said blanks in the course of the feeding motion into their due position for further treatment and other means for advancing the other series of cuts in any given feeding direction and for turning these blanks in the course of the feeding motion into a position uniform to the final position of the first series of cuts with respect to the machine.

31. An envelope blank cutting and turning mechanism for envelope making machines comprising blank cutting means containing cutting edges adapted to sever the blanks, said edges being arranged to cut the blanks in different disposition, means for advancing the one series of uniformly disposed blanks and for keeping said blanks in their original position with respect to the machine and other means for advancing the other series of uniformly disposed blanks and for turning these blanks in the course of the feeding motion into a position uniform to the position of the first series of cuts with respect to the machine.

32. An envelope blank cutting and turning mechanism for envelope making machines comprising blank cutting means containing cutting edges adapted to sever the blanks, said edges being arranged to cut the blanks in different disposition, means for advancing the one series of uniformly disposed blanks in circular feeding direction and for keeping said blanks in their original position with respect to the machine and other means for advancing the other series of uniformly disposed blanks in circular feeding direction and for turning these blanks in the course of the feeding motion into a position uniform to the position of the first series of cuts with respect to the machine.

33. An envelope blank cutting and turning mechanism for envelope making machines comprising blank cutting means containing cutting edges adapted to sever the blanks, said edges being arranged to cut the blanks in different disposition, means for advancing the one series of uniformly disposed blanks in circular feeding direction and for bringing said blanks in the course of the feeding motion into their due position for further treatment and other means for advancing the other series of uniformly disposed blanks in circular feeding direction and for turning these blanks in the course of the feeding motion into a position uniform to the final position of the first series of cuts with respect to the machine.

34. An envelope blank cutting and turning mechanism for envelope making machines comprising blank cutting means containing cutting edges adapted to sever the blanks, said edges being arranged to cut the blanks in different disposition, means for advancing the one series of uniformly disposed blanks and for keeping said blanks in their original position with respect to the machine and a unidirectionally rotating device provided with means for bringing the other series of uniformly disposed blanks into a position uniform to that of the first series of cuts with respect to the machine.

35. An envelope blank cutting and turning mechanism for envelope making machines comprising blank cutting means containing cutting edges adapted to sever the blanks, said edges being arranged to cut the blanks in different disposition, other cutting means for completely cutting the blanks, means for advancing the one series of uniformly disposed cuts in any given feeding direction and for bringing said blanks in the course of the feeding motion into their due position for further treatment and other means for advancing the other series of cuts in any given feeding direction and for turning these blanks in the course of the feeding motion into a position uniform to the final position of the first series of cuts with respect to the machine.

36. An envelope blank cutting and turning mechanism for envelope making machines comprising blank cutting means containing cutting edges adapted to sever the blanks, said edges being arranged to cut the blanks in different disposition, other cutting means for completely cutting the blanks, means for advancing the one series of uniformly disposed blanks and for keeping said blanks in their original position with respect to the machine and other means for advancing the other series of uniformly disposed blanks and for turning these blanks in the course of the feeding motion into a position uniform to the position of the first series of cuts with respect to the machine.

37. An envelope blank cutting and turning mechanism for envelope making machines comprising blank cutting means containing cutting edges adapted to sever the blanks, said edges being arranged to cut the blanks in different disposition, other cutting means for completely cutting the blanks, means for advancing the one series of uniformly disposed blanks and for keeping said blanks in their original position with respect to the machine and a unidirectionally rotating device provided with means for bringing the other series of uniformly disposed blanks into a position uniform to that of the first series of cuts with respect to the machine.

HEINRICH WOLFF.